US012570512B2

(12) United States Patent
Zumberger et al.

(10) Patent No.: US 12,570,512 B2
(45) Date of Patent: *Mar. 10, 2026

(54) CAN LINER SYSTEM AND RE-STACKER ASSEMBLY THEREFOR

(71) Applicant: Stolle Machinery Company, LLC, Centennial, CO (US)

(72) Inventors: Neil Albert Zumberger, Sidney, OH (US); Bryan Lee Schoenlein, Minster, OH (US); Dennis Cornelius Stammen, Brookville, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/660,285

(22) Filed: May 10, 2024

(65) Prior Publication Data

US 2024/0286880 A1 Aug. 29, 2024

Related U.S. Application Data

(63) Continuation of application No. 17/818,130, filed on Aug. 8, 2022, now Pat. No. 12,006,199.

(51) Int. Cl.
*B67B 3/064* (2006.01)
*B67B 3/26* (2006.01)

(52) U.S. Cl.
CPC .............. *B67B 3/0645* (2013.01); *B67B 3/26* (2013.01)

(58) Field of Classification Search
CPC ........ B65B 7/2807; B67B 3/26; B65G 57/035
See application file for complete search history.

(56) References Cited

U.S. PATENT DOCUMENTS

| | | | | |
|---|---|---|---|---|
| 4,391,560 A * | 7/1983 | Fardin | B65G 47/248 | 198/462.1 |
| 6,547,057 B1 * | 4/2003 | Carson | B65G 47/252 | 198/408 |
| 7,293,395 B1 * | 11/2007 | Galloway | B65B 61/207 | 198/380 |
| 2005/0092767 A1 * | 5/2005 | Schroeder | A47F 1/085 | 221/208 |
| 2010/0209604 A1 * | 8/2010 | Stammen | B05C 5/0216 | 118/503 |
| 2011/0285080 A1 * | 11/2011 | Gendreau | B65H 29/32 | 271/207 |
| 2013/0259631 A1 * | 10/2013 | Allen | B65H 83/02 | 414/794.6 |
| 2014/0175115 A1 * | 6/2014 | Walsh | G07F 11/24 | 221/222 |
| 2018/0057194 A1 * | 3/2018 | Burken | B65B 7/2807 | |

* cited by examiner

*Primary Examiner* — Andrew M Tecco
*Assistant Examiner* — Nicholas E Igbokwe
(74) *Attorney, Agent, or Firm* — Eckert Seamans Cherin & Mellott, LLC

(57) ABSTRACT

A re-stacker assembly used to stack container closures that are output by a can liner system includes at least one offloading assembly having a receiving portion, at least one loading device coupled to the offloading assembly, and a motion control system for detecting motion of the container closures and, in response to detecting such motion, driving the loading device to stack, or re-stack, the container closures in a predetermined manner.

20 Claims, 5 Drawing Sheets

CAN LINER SYSTEM AND RE-STACKER ASSEMBLY THEREFOR

CROSS REFERENCE TO RELATED APPLICATIONS

This application is a continuation application of and claims priority to U.S. patent application Ser. No. 17/818,130, filed Aug. 8, 2022, entitled, Can Liner System and Re-Stacker Assembly Therefor.

FIELD OF THE INVENTION

The disclosed concept relates generally to machinery for container closures and, more particularly, to can liner systems for container closures such as, for example, can ends. The disclosed concept also relates to re-stacker assemblies for can liner systems.

BACKGROUND OF THE INVENTION

It is known to apply sealant material, commonly referred to as compound, to the underside of container closures, for example, to facilitate subsequent sealing attachment (e.g., without limitation, seaming) of the closures to containers such as, for example, beer/beverage and food cans.

A liner machine, such as for example and without limitation, the rotary liner machine, is used to line (i.e., apply sealant or compound) to container closures, commonly referred to as can lids, shells, or can ends. Traditional liner machines (sometimes referred to simply as "liners") generally include a base having a processing assembly. In a rotary liner for example, the processing assembly may include a chuck assembly having a number of rotatable chucks, and a pivotal upper turret assembly disposed over the chuck assembly and including an electrical tank assembly, a rotary compound tank assembly, and a number of peripherally disposed fluid dispensing apparatus (e.g., sealant or compound guns) each being associated with a corresponding rotatable chuck of the chuck assembly. In operation, the can ends or shells coming into the liner are delivered into a downstacker in "stick" form (i.e., nested together in a vertical column or stack). The liner machine peels the bottom can end or shell from the bottom of the stack and deposits it into the aforementioned processing assembly where lining compound is subsequently applied. Once completely lined, the can ends or shells 4 are ejected linearly in the direction of arrow 1 onto a flat belt conveyor 2 (indicated generally in simplified form in FIG. 1), which then conveys the freshly lined shells 4 directly into a vacuum hopper 13, as shown in FIG. 1, where the shells 4 are stacked, or re-stacked (not shown), for transportation.

Among other disadvantages, this manner of conveying and re-stacking freshly lined shells does not employ any time-gating devices to ensure the shells are re-stacked in an efficient manner, or that the compound has sufficiently cured within the shells prior to re-stacking. Consequently, traditional liner machines are unable to re-stack shells at high speeds (e.g., without limitation, 2100 ends per minute (EPM), or more) without damaging the shells and/or displacing compound within the shells. More specifically, there is no mechanism to prevent the shells from being re-stacked in a suboptimal configuration, for example, with shells undesirably overlapping, commonly referred to as "shingling," which can result in jamming. Furthermore, lining compound can be displaced from the shell, commonly referred to as compound spillover. Moreover, forces applied to the shells during the re-stacking process can result in physical damage to the shells. These issues have historically limited the operating speed of liner machines to 2100 EPM, or less. Accordingly, production output, or throughput, has been limited.

There is, therefore, room for improvement in can liner systems and in re-stacker assemblies therefor.

SUMMARY OF THE INVENTION

These needs, and others, are met by embodiments of the disclosed concept, which are directed to a re-stacker assembly and can liner system. Among other advantages, the re-stacker assembly reduces forces applied to container closures, thereby overcoming known disadvantages of prior art liner systems and allowing the liner to operate at greater speeds and increased production volumes.

As one aspect of the disclosed concept, a re-stacker assembly comprises: at least one offloading assembly having a receiving portion structured to receive a plurality of container closures; at least one loading device coupled to the offloading assembly; and a motion control system structured to detect motion of the container closures and in response to detecting such motion, drive the loading device to stack the container closures in a predetermined manner.

The motion control system may comprise at least one presence sensor and a motor operatively coupled to the loading device, and the offloading assembly may include an opening disposed proximate the presence sensor and the receiving portion, wherein the motor is structured to move the loading device to direct the container closures through the opening of the offloading assembly. The motion control system may further comprise a control unit, wherein the motor and the at least one presence sensor are communicably coupled to the control unit. The at least one presence sensor may include a primary presence sensor and a secondary presence sensor, wherein the primary presence sensor is disposed adjacent to the receiving portion, and wherein the secondary presence sensor is disposed offset from the primary presence sensor.

The offloading assembly may further comprise a hopper having an opening, wherein the loading device is a kicker wheel positioned over the opening of the hopper. The kicker wheel may include a number of projections, wherein the projections are structured to direct said container closures through the opening to be stacked within the hopper. The motion control system may further comprise a supplemental presence sensor disposed within the hopper.

A liner system employing the aforementioned re-stacking assembly is also disclosed.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
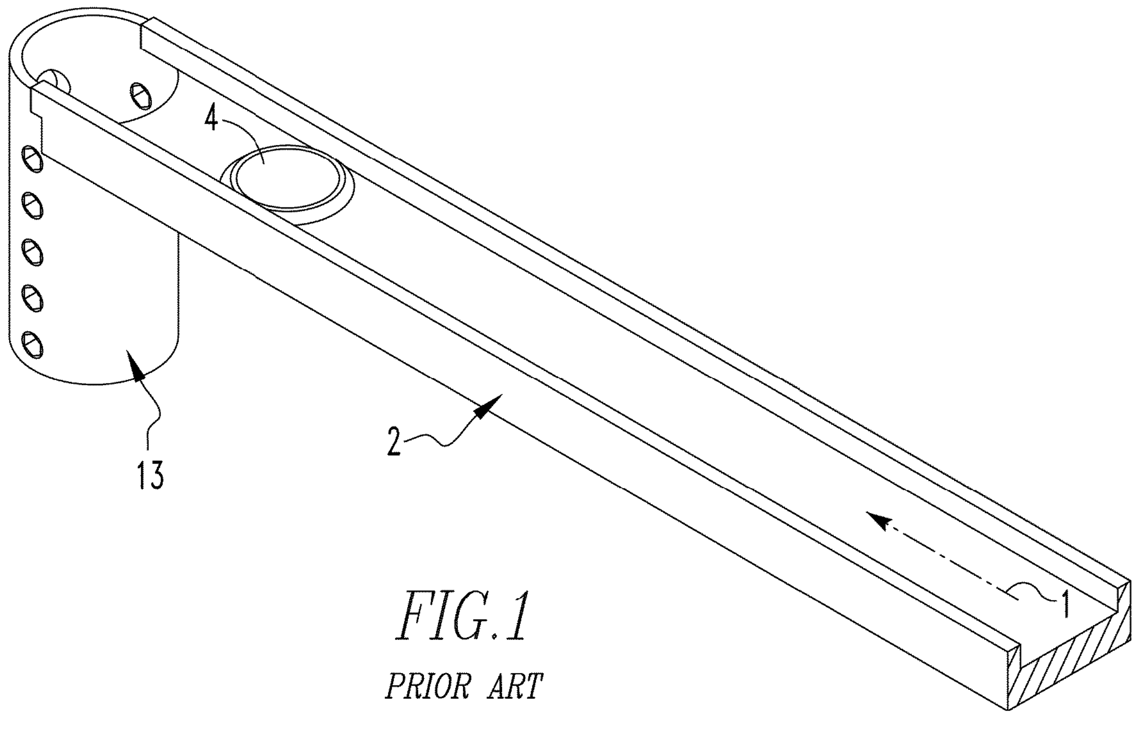
FIG.1 PRIOR ART
FIG. 1 is a perspective view of a prior art rotary liner.

It will be appreciated that although a re-stacker assembly in accordance with the disclosed concept is shown and described herein as used with respect to a rotary liner for applying a sealant or compound to container closures, e.g., without limitation can ends, it could alternatively be employed to convey container closures with a wide variety of other types of equipment and machines (not shown) in other applications.

Directional phrases used herein, such as, for example, up, down, clockwise, counterclockwise and derivatives thereof, relate to the orientation of the elements shown in the drawings and are not limiting upon the claims unless expressly recited therein.

The specific elements illustrated in the drawings and described herein are simply exemplary embodiments of the disclosed concept. Accordingly, specific dimensions, orientations and other physical characteristics related to the embodiments disclosed herein are not to be considered limiting on the scope of the disclosed concept.

As employed herein, the statement that two or more parts are "coupled" or "mounted" together shall mean that the parts are joined together either directly or joined through one or more intermediate parts.

As used herein, the term "terminally connected" shall mean that a first component is connected to a terminal end of a second component that has a definable longitudinal axis.

As used herein, the term "operatively coupled" shall mean two or more components are functionally connected through one or more intermediate parts such that displacement, manipulation, or actuation of any of the coupled components causes a predefined response in the remaining components.

As used herein, the term "communicably coupled" shall mean that two or more electrical components are connected in such a way that power, information, or both may be exchanged between the coupled components.

As used herein, the term "distributed" shall mean that a plurality of first components is positioned within, around, or across a second component. Additionally, one or more of the aforementioned descriptions may be applied to the distribution of the plurality of first components relative to the second component. Further, the plurality of first components may be arranged in an ordered or random configuration.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "number" means one or a number greater than one (i.e., a plurality).

Referring generally to FIGS. 2-5, the disclosed concept is directed to an assembly built for the purpose of transitioning a plurality of lined container closures 4 (FIGS. 3 and 4) from an initial vertical orientation to a horizontal orientation, and finally back into a vertical orientation. In more detail, the arrows shown in FIG. 2 generally depict the direction of movement of the container closures 4. That is, the overall process executed by the disclosed concept is as follows; first, container closures 4 or "lids" are directed into a can liner system 1 in a vertical stack, commonly referred to as a "stick," whereby the container closures 4 are nested and stacked together in a vertical column. Thus, the term "stick" is used herein to refer to a vertical column of stacked and nested container closures 4. The container closures 4 are peeled or removed from the bottom of the stack and moved into the can liner system 10 where lining compound is applied, for example and without limitation, into the curl of the container closures 4 (e.g., shells or can ends). Once completely lined, the container closures 4 are then ejected from the can liner system 10 and transported (e.g., conveyed) in a horizontal orientation by a conveyor system 20 to a re-stacker assembly 3, where they are re-stacked again in a vertical orientation, in stick form.

As will be discussed, among other benefits, the disclosed concept provides a means for increasing the speed at which the container closures 4 can be processed. Specifically, in a preferred embodiment, the disclosed concept enables processing speeds of 2100 ends per minute (EPM), or more. Further, the disclosed concept improves upon previous technology utilized in the industry by reducing the forces applied to container closures 4 during the re-stacking process. The reduction of forces applied to the container closures 4 minimizes, or eliminates, the occurrence of physical damage to the container closures 4. The reduced forces applied to the container closures 4 also minimizes, or eliminates, the possibility of a lining compound being undesirably displaced (e.g., without limitation, spilling out of the curl of the shell or can end).

Figure 3:
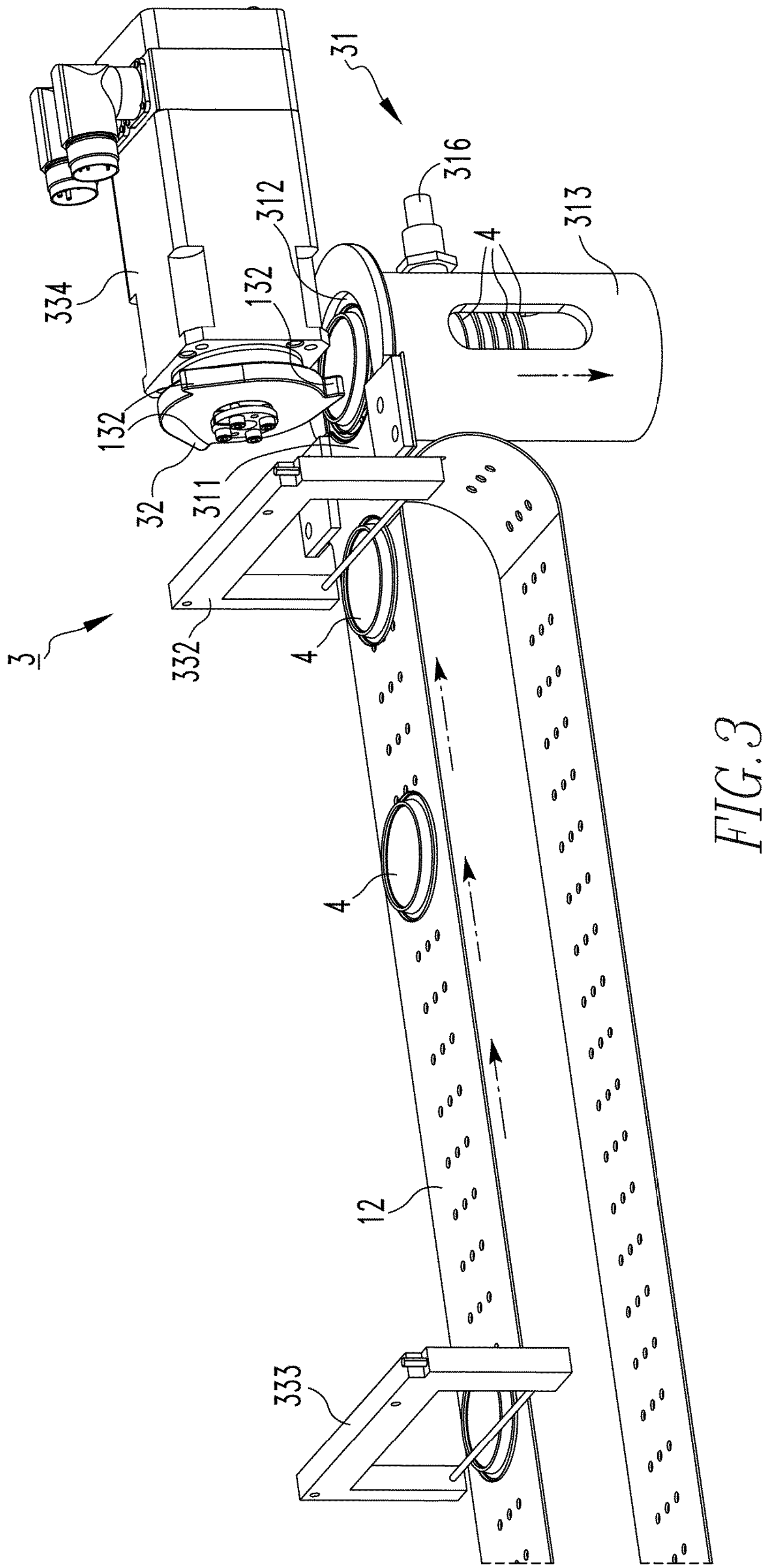
FIG. 3 is a perspective view of the re-stacker assembly of FIG. 2.
Figure 4:
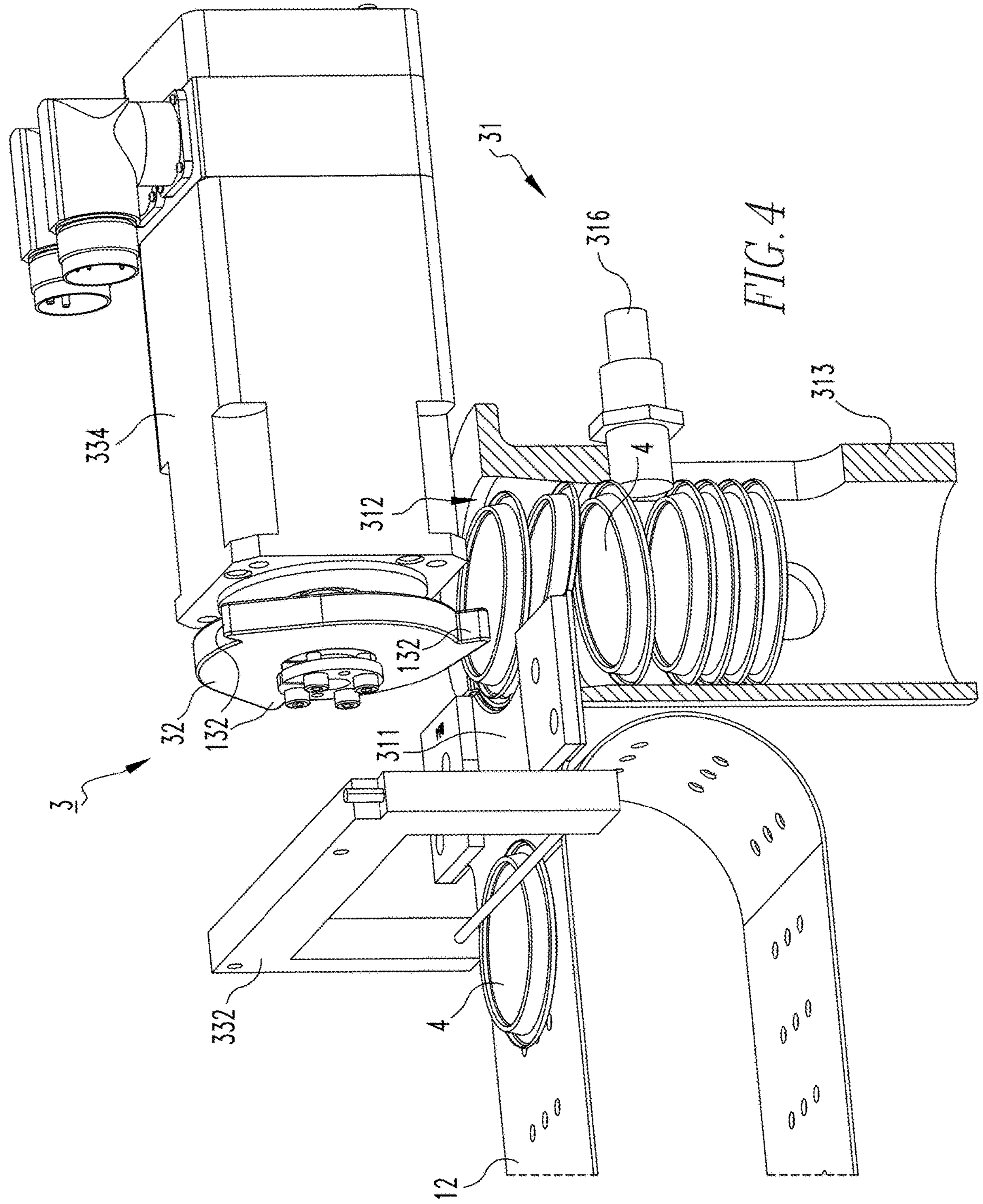
FIG. 4 is a perspective view of a portion of the re-stacker assembly of FIG. 3 with the hopper shown in section view.

As best shown in FIG. 3 and FIG. 4, the disclosed concept provides a means to re-stacking lined container closures 4 that were initially traveling in a horizontal direction. The example conveyor system 20 includes a number of conveyor belts 12. The container closures 4 that are deposited onto the conveyor belt(s) 12 are initially spaced apart by the can liner system 10. During the time on the horizontal conveyor belt(s) 12, the container closures 4 may be inspected and slowed down before reaching an input area of the re-stacker assembly 3. The container closures 4 are then delivered to the re-stacker assembly 3 along the same horizontal direction of travel as the conveyor system 20. In one non-limiting example embodiment, the conveyor system 20 may slow down the container closures 4, for example and without limitation, by using a series of multiple conveyor belts 12 (only one is shown and described in detail herein for simplicity of disclosure) with each successive conveyor belt 12 moving slower than the one preceding it.

As will be discussed in greater detail hereinbelow, in an exemplary embodiment, the re-stacker assembly 3 employs a number of presence sensors (e.g., presence sensors 332, 333, both shown in FIG. 3) to determine the position and rate of travel of the container closures 4 traveling along the conveyor belt(s) 12. The presence sensor(s) 332,333 is/are used to determine the physical location of the container closures 4. It will be appreciated that the presence sensor(s) 332,333 may include, for example and without limitation, ultrasonic sensors, optical sensors, proximity sensors, and computer vision systems. This information is used in turn to modify the rate at which a loading device 32 deposits the lined container closures 4 into a hopper 313. The number of presence sensors 332,333, as well as the structure and operation of an associated offloading assembly 31 advantageously function to create spacing between the container closures 4 as the container closures 4 are deposited into the hopper 313 in a predetermined desired manner.

Figure 2:
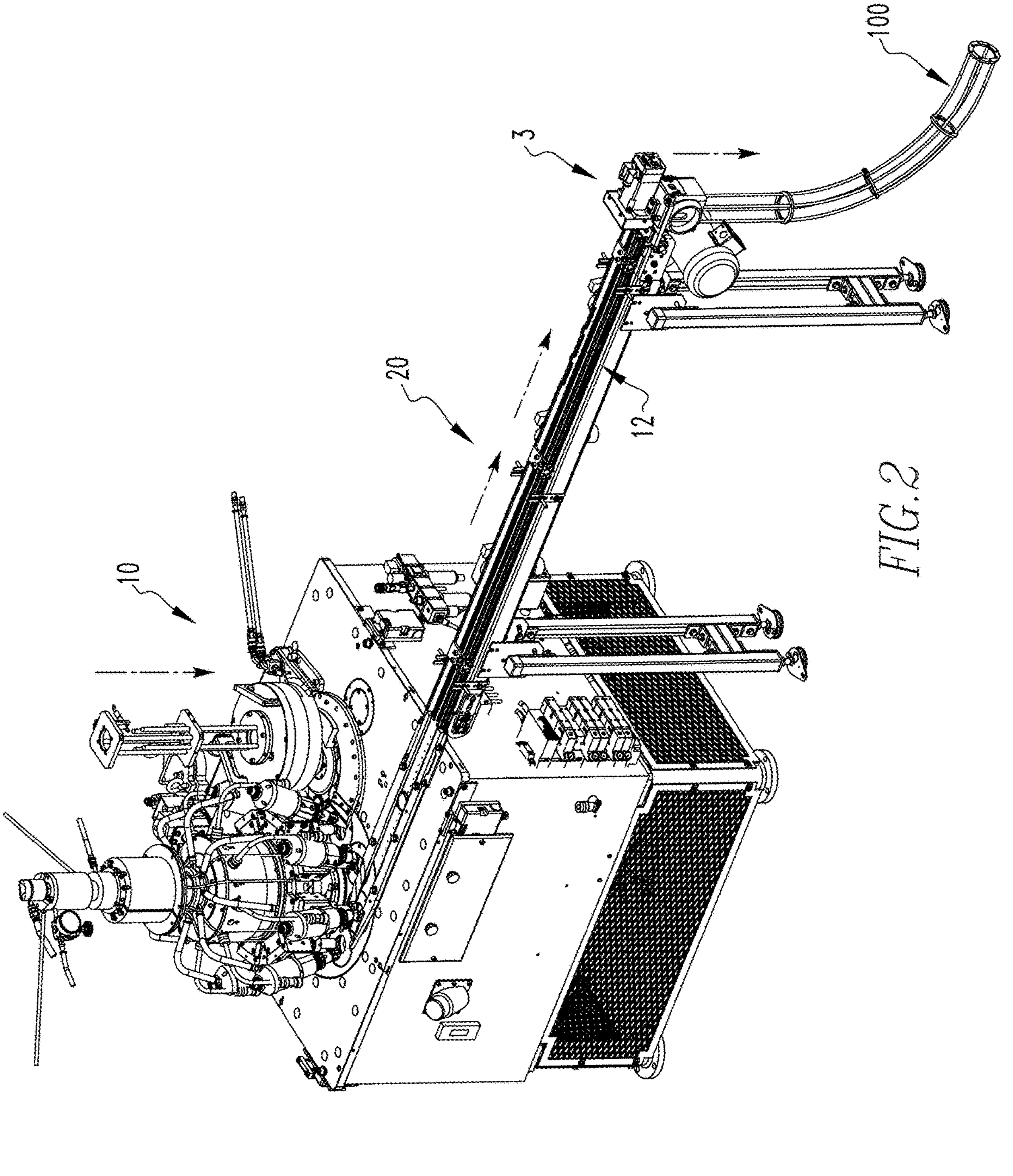
FIG. 2 is a perspective view of a can liner system and a re-stacker assembly therefor in accordance with a non-limiting embodiment of the disclosed concept.

Continuing to refer to FIGS. 3 and 4, the hopper 313 allows for a controlled area (e.g., receptacle) where the container closures 4 are re-stacked and presented to end module track work 100 (shown in FIG. 2). Further, a vacuum generator 315 (FIG. 5) may be attached to the hopper 313 to induce a vacuum that biases (e.g., moves) the container closures 4 toward the bottom of the hopper 313 to facilitate proper re-stacking. These features reduce the physical forces exerted on the container closures 4 while providing an effective way of controlling the orientation and travel of the container closures 4 within and/or through the hopper 313 in a predetermined manner.

Figure 5:
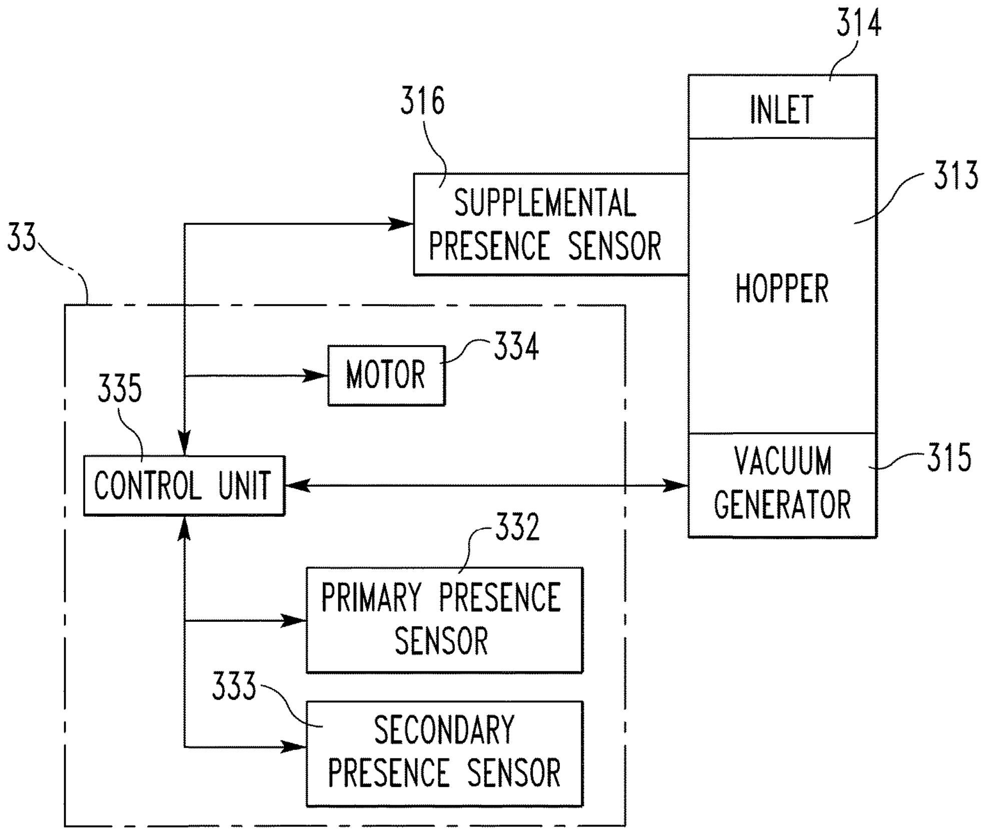
FIG. 5 is a schematic diagram of the re-stacker assembly.

Referring to FIGS. 3-5, the example re-stacker assembly 3 shown and described herein uses an offloading assembly 31, a loading device 32, and a motion control system 33 (FIG. 5) to manipulate and move the container closures 4 into a hopper 313 in a predetermined controlled manner. Further, the disclosed concepts make use of the motion control system 33 (FIG. 5) to coordinate the operation of the offloading assembly 31 and the loading device 32 such that the rate at which the loading device 32 deposits the container closures 4 into the hopper 313 is dynamically modified based on the location and rate of travel of the leading container closure 4 among a series or stream of container closures 4. That is, the loading device 32 is positioned to load each container closure 4 into the hopper 313 whenever the container closure 4 is moved to a receiving portion 311 of the offloading assembly 31 by the conveyor belt(s) 12. The loading device 32 is designed to manipulate and orient the container closures 4 in a manner that avoids damage or other undesirable issues such as jamming and compound displacement (e.g., spilling).

Continuing to refer to FIG. 4 and FIG. 5, in order to achieve the above-described functionality, the offloading assembly 31 is designed to receive the stream of container closures 4 traveling along a generally horizontal direction and to move (e.g., reorient; re-stack) them in a generally vertical stack, as best shown in the section view of FIG. 4. Generally, the loading device 32 is a mechanical actuator used to modify the position of an object (e.g., container closure 4). Specifically, embodiments of the disclosed concept may use loading devices 32 such as, for example and without limitation, kicker wheels (shown), robotic arms (not shown), and pistons (not shown). The loading device 32 is preferably coupled to and cooperates with the offloading assembly 31. In the example shown, the kicker wheel 32 includes a number of projections 132 (three are shown) such that as the kicker wheel 32 rotates, the projections 132 engage and move corresponding container closures 4 through an opening 312 in the hopper 313 in a predetermined desired manner to form the stack, as best shown in FIG. 4. Thus, as used herein, the term “kicker wheel” refers to a loading device structured to reorient container closures 4 from a horizontal orientation to a vertical orientation and expressly includes, but is not limited to, a rotary member having any known or suitable number, type, and/or configuration of projections structured to engage and move the container closures 4 in a desired manner.

The motion control system 33 (FIG. 5) is preferably an automated control system used to analyze the state of the stream of container closures 4 and to control and move (e.g., rotate) the loading device 32 (e.g., kicker wheel), accordingly. Specifically, the motion control system 33 is structured to rotate the loading device 32 in response to detecting motion within the receiving portion 311 of the offloading assembly 31. That is, the motion control system 33 drives (e.g., rotates) the loading device 32 to deposit the stream of container closures 4 in an incremented manner such that the time required for the loading device 32 to deposit an arbitrary container closure 4 and then be repositioned to receive a subsequent container closure 4 at the receiving portion 311 is less than, or equal to, the time it takes for the subsequent container closure 4 to arrive at the receiving portion 311 and be engaged and manipulated by the next projection 132 of the loading device (e.g., kicker wheel 32) into the hopper 313, as desired.

Referring to FIGS. 3-5, the motion control system 33 (FIG. 5) preferably includes the aforementioned presence sensors 332,333, a motor 334, and a control unit 335 (FIG. 5). The control unit 335 is a processing system designed to perform the data analysis and component control operations required to operate the disclosed re-stacker assembly 3. The control unit 335 may be, for example and without limitation, a smartphone, a local microcontroller, or a remote server. The motor 334 and presence sensor(s) 332,333 are communicably coupled to the control unit 335. An opening 312 of the offloading assembly 31 is disposed proximate the presence sensor 332 and receiving portion 311. For example, the opening 312 of the offloading assembly 31 may be a feed port or channel designed to transition the container closures 4 through and off of the receiving portion 311 and into, for example and without limitation, the aforementioned hopper 313 for storage, transport, and/or further processing.

In more detail, the presence sensor(s) 332,333 detect(s) the arrival of the container closure 4 from the conveyor belt(s) 12 onto the disclosed re-stacker assembly 3. This information is relayed to the control unit 335. As noted, the motor 334 is operatively coupled to the loading device (e.g., kicker wheel 32). More specifically, the control unit 335 uses the information received from the presence sensor(s) 332, 333 to generate instructions that cause the motor 334 to make both fine and/or coarse adjustments to the positioning (e.g., without limitation, rotation; rotational speed) of the loading device 32. These adjustments enable the motor 334 to drive (e.g., rotate) the loading device 32 to move the container closures 4 through the opening 312 of the offloading assembly 31 in a desired predetermined manner. As noted, in the non-limiting embodiment example embodiment shown and described herein, the loading device 32 is a kicker wheel having a plurality of projections 132 (three are shown), and the motor 334 controls the rotational speed of the kicker wheel 32 such that the kicker wheel 32, and specifically the projections 132 thereof, are able to engage and manipulate corresponding container closures 4 through the opening 312 at a rate that is controlled as desired by the control unit 335. Thus, minimal force is required to move the container closures 4 past the receiving portion 311 and into the hopper 313. Once through the opening 312, the vacuum generator 315 draws the container closures 4 through the hopper 313 until the container closures 4 are nestled together in stick form in a predetermined desired orientation.

Referring to FIGS. 3 and 4, the example re-stacker assembly 3 preferably includes a plurality of presence sensors, specifically a first or primary presence sensor 332 and a second or secondary presence sensor 333, as well as a supplemental presence sensor 316. The primary presence sensor 332 is preferably disposed adjacent to the receiving portion 311 of the offloading assembly 31 and used to determine whether fine adjustments to the positioning of the loading device 32 must be made as the container closures 4 are being moved into and through the opening 312 of the offloading assembly 31. The secondary presence sensor 333 is preferably disposed offset from the primary presence sensor 332, as best shown in FIG. 3, and is used to determine whether coarse adjustments to the positioning of the loading device 32 must be made as container closures 4 are being moved along the conveyor system 20. It will be appreciated that embodiments (not shown) where a plurality of secondary presence sensors 333 may be distributed along the length of the conveyor system 20 are also contemplated, without departing from the scope of the disclosed concept. Such embodiments could be advantageously employed, for example and without limitation, to determine the state of multiple container closures 4 at once, to track a single container closure 4 at multiple positions along the conveyor system 20, and/or to monitor one or more operating characteristics of the conveyor system 20, in general. The information gathered by each presence sensor 332,333 may, for example, be used to increase or decrease the rate of conveyance by increasing or decreasing the speed of one or more corresponding conveyor belt 12 at a number of locations along the conveyor system 20.

As shown in FIGS. 3 and 4 embodiments of the disclosed re-stacker assembly 3 are designed with offloading assemblies 31 that include the aforementioned hopper 313. In the example shown, the hopper 313 is mounted adjacent to the opening 312 of the offloading assembly 31 such that the loading device is disposed opposite to the hopper 313 across the opening 312. The hopper 313 is advantageously placed to receive the container closures 4 that are ready to be deposited by the loading device 32. It will be appreciated that the hopper 313 may, for example, be a detachable storage device that may, for example, be removed and transported once filled with container closures 4. It will further be appreciated that the hopper 313 may part of, or may cooperate with, conveyance trackwork 100, as generally shown in FIG. 2.

Accordingly, it will be appreciated that the disclosed re-stacker assembly 3 is designed to facilitate rapid re-stacking operations that reduce the forces applied to the container closures 4. To facilitate this, an exemplary embodiment of the disclosed re-stacker assembly 3 further includes the aforementioned vacuum generator 315 (FIG. 5; also generally shown in FIG. 2) and supplemental presence sensor 316, best shown in the section view of FIG. 4. The vacuum generator 315 is in fluid communication with the hopper 313 to induce a vacuum therein. As previously noted, such vacuum draws the container closures 4 into the hopper 313 and to prevent undesired interaction (e.g., overlapping, jamming) between and among container closures 4 within the hopper 313. The supplemental presence sensor 316 is disposed within the hopper proximate the inlet or opening 312 of the hopper 313 and is communicably coupled to the control unit 335. Among other functions, for example and without limitation, the supplemental presence sensor 316 is able to determine when the hopper 313 is full, or nearly full.

Accordingly, among other advantages and benefits, the re-stacker assembly 3 and the can liner system 1 in accordance with the disclosed concept, is preferably capable of processing speeds of at least 2100 EPM, and more preferably, processing speeds of up to 3500 EPM, or more, and also reduces the forces applied to container closures 4 during the re-stacking process to minimize, or eliminate, physical damage to the container closures 4, as well as to minimize, or eliminate, lining compound displacement. Further, the disclosed concept provides a system for quickly and efficiently forming predetermined desired configurations (e.g., sticks) of lined container closures 4 that are ready for transport (e.g., shipping) or further processing.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept, which is to be given the full breadth of the claims appended and any and all equivalents thereof.

What is claimed is:

1. A re-stacker assembly comprising:

an offloading assembly having a receiving portion structured to receive a plurality of individually unstacked container closures and a hopper having an opening;

a loading device coupled to the offloading assembly and structured to direct said container closures through the opening in an incremented manner to be stacked within the hopper; and a motion control system structured to detect motion of said container closures and in response to detecting said motion, to drive the loading device at a rate based on the detected motion such that a time for the loading device to direct one container closure and then be repositioned to receive a next container closure is less than or equal to a time it takes for the next container closure to arrive at the receiving portion of the offloading assembly.

2. The re-stacker assembly of claim 1, wherein the motion control system comprises at least one presence sensor including a primary presence sensor, and a motor operatively coupled to the loading device; wherein the opening is disposed proximate the primary presence sensor and the receiving portion; and wherein the motor is structured to rotate the loading device to direct the container closures through the opening.

3. The re-stacker assembly of claim 2, wherein the motion control system further comprises a control unit; and wherein the motor and the at least one presence sensor are communicably coupled to the control unit.

4. The re-stacker assembly of claim 3, wherein the at least one presence sensor includes a secondary presence sensor; wherein the primary presence sensor is disposed adjacent to the receiving portion; and wherein the secondary presence sensor is disposed offset from the primary presence sensor.

5. The re-stacker assembly of claim 2, wherein the at least one presence sensor includes a supplemental presence sensor; and wherein the supplemental presence sensor is disposed within the hopper.

6. The re-stacker assembly of claim 5, wherein the supplemental presence sensor is communicably coupled to the control unit.

7. The re-stacker assembly of claim 1, wherein the loading device is positioned over the opening of the hopper.

8. The re-stacker assembly of claim 1, wherein the loading device is a kicker wheel including a number of projections including a first projection and a second projection, and wherein the projections are structured to direct said container closures through the opening.

9. The re-stacker assembly of claim 1, wherein the offloading assembly further comprises a vacuum generator; and wherein the vacuum generator is in fluid communication with the hopper.

10. A re-stacker assembly comprising:

an offloading assembly having a receiving portion structured to receive a plurality of individually unstacked container closures and a hopper having an opening;

a loading device coupled to the offloading assembly and structured to direct said container closures through the opening in an incremented manner to be stacked within the hopper; and a motion control system structured to detect motion of said container closures and in response to detecting said motion, to drive the loading device at a rate based on the detected motion such that a time for the loading device to direct one container closure and then be repositioned to receive a next container closure is less than or equal to a time it takes for the next container closure to arrive at the receiving portion of the offloading assembly, wherein the loading device is a kicker wheel including a number of projections including a first projection and a second projection, and wherein the projections are structured to direct said container closures through the opening, wherein the motion control system is structured to control a rate of rotation of the kicker wheel such that after the first projection directs one container closure through the opening the kicker wheel is rotated and is in position to direct a next container closure through the opening with the second projection before the next container closure arrives at the kicker wheel.

11. A can liner system comprising:

a liner machine for lining a plurality of container closures;

a conveyor system for conveying said plurality of container closures in an individually unstacked orientation from the liner; and a re-stacker assembly comprising:

an offloading assembly disposed adjacent the conveyor system and including a receiving portion structured to receive said individually unstacked container closures from the conveyor system and a hopper having an opening, a loading device coupled to the offloading assembly and structured to direct said container closures through the opening in an incremented manner to be stacked within the hopper; and a motion control system structured to detect motion of said container closures and in response to detecting said motion, to drive the loading device at a rate based on the detected motion such that a time for the loading device to direct one container closure and then be repositioned to receive a next container closure is less than or equal to a time it takes for the next container closure to arrive at the receiving portion of the offloading assembly.

12. The can liner system of claim 11, wherein the motion control system comprises at least one presence sensor including a primary presence sensor, and a motor operatively coupled to the loading device; wherein the opening is disposed proximate the primary presence sensor and the receiving portion; and wherein the motor is structured to rotate the loading device to direct the container closures through the opening.

13. The can liner system of claim 12, wherein the motion control system further comprises a control unit; and wherein the motor and the at least one presence sensor are communicably coupled to the control unit.

14. The can liner system of claim 13, wherein the at least one presence sensor includes a secondary presence sensor; wherein the primary presence sensor is disposed adjacent to the receiving portion; and wherein the secondary presence sensor is disposed offset from the primary presence sensor.

15. The can liner system of claim 12, wherein the at least one sensor includes a supplemental presence sensor; and wherein the supplemental presence sensor is disposed within the hopper.

16. The can liner system of claim 15, wherein the supplemental presence sensor is communicably coupled to the control unit.

17. The can liner system of claim 11, wherein the loading device is positioned over the opening of the hopper.

18. The can liner system of claim 11, wherein the loading device is a kicker wheel including a number of projections including a first projection and a second projection, and wherein the projections are structured to direct said container closures through the opening.

19. The can liner system of claim 18, wherein the motion control system is structured to control a rate of rotation of the kicker wheel such that after the first projection directs one container closure through the opening the kicker wheel is rotated and is in position to direct a next container closure through the opening with the second projection before the next container closure arrives at the kicker wheel.

20. The can liner system of claim 11, wherein the offloading assembly further comprises a vacuum generator; and wherein the vacuum generator is in fluid communication with the hopper.

* * * * *